Nov. 21, 1950   W. F. BOHL, JR   2,530,936
FILM PROJECTING APPARATUS
Filed Nov. 10, 1948                           2 Sheets-Sheet 1

INVENTOR.
WILLIAM F. BOHL, JR.
BY
*Raymond F. Ternes*
ATTORNEY.

Nov. 21, 1950  W. F. BOHL, JR  2,530,936
FILM PROJECTING APPARATUS
Filed Nov. 10, 1948  2 Sheets-Sheet 2

INVENTOR.
WILLIAM F. BOHL, JR.
BY
Raymond P. Ternes
ATTORNEY.

Patented Nov. 21, 1950

2,530,936

UNITED STATES PATENT OFFICE 2,530,936

FILM PROJECTING APPARATUS

William F. Bohl, Jr., Detroit, Mich., assignor to Training Devices, Inc., Detroit, Mich., a corporation of Michigan Application November 10, 1948, Serial No. 59,373

2 Claims. (Cl. 88—18.7)

This invention relates to a film projecting apparatus and, in particular, it relates to a projection apparatus adapted for continuous operation.

Most types of projecting apparatus include a film arrangement whereby the film is supplied on one reel and is wound up on a second reel. When a length of film has passed through the projection apparatus it is necessary to stop the machine and rewind the film before it can continue in a similar cycle of operation. It is recognized that continuous projection is possible by supporting an endless film in festoon arrangement. In such cases, however, the bulk of the apparatus required results in a limitation on the length of the film that may be used.

In accordance with the practice of my invention, I have found that the film retainer may be contained in a single reel and that convolutions of the film roll may be removed from the interior of the roll while the return film is fed onto the outside of the film roll. This may be accomplished notwithstanding the fact that the roll embodies several hundred feet of film. To accomplish this, however, it is necessary that the holder for the film be positioned in a critical relationship with the projection apparatus and that the speed of the film be controlled with a substantial pause between each increment of advancement of a film frame. I also find it desirable that the apparatus for advancing the film should operate smoothly and positively so as to allow proper adjustment of the convolutions in the film roll. These features are believed to be critical to the extent that the film drive and supply roll function jointly in combination with one another so as to obtain the desired result.

It is also to be understood that the invention herein is not to be confused with the standard motion picture projector in which individual frames are rapidly moved in sequence. The present projector is intended for use in projecting a single frame at a time and allowing a visual inspection of each projected image before the film is advanced to the next frame. By utilizing a combination as herein described it is possible to run the apparatus continuously for long periods without any attention other than to start and stop the projector as desired. As an example, the projector may operate continuously for a period of several days at a time.

Other objects and advantages of the invention will appear more fully in the following detailed description when considered in connection with the accompanying drawings, in which.

Figure 1:
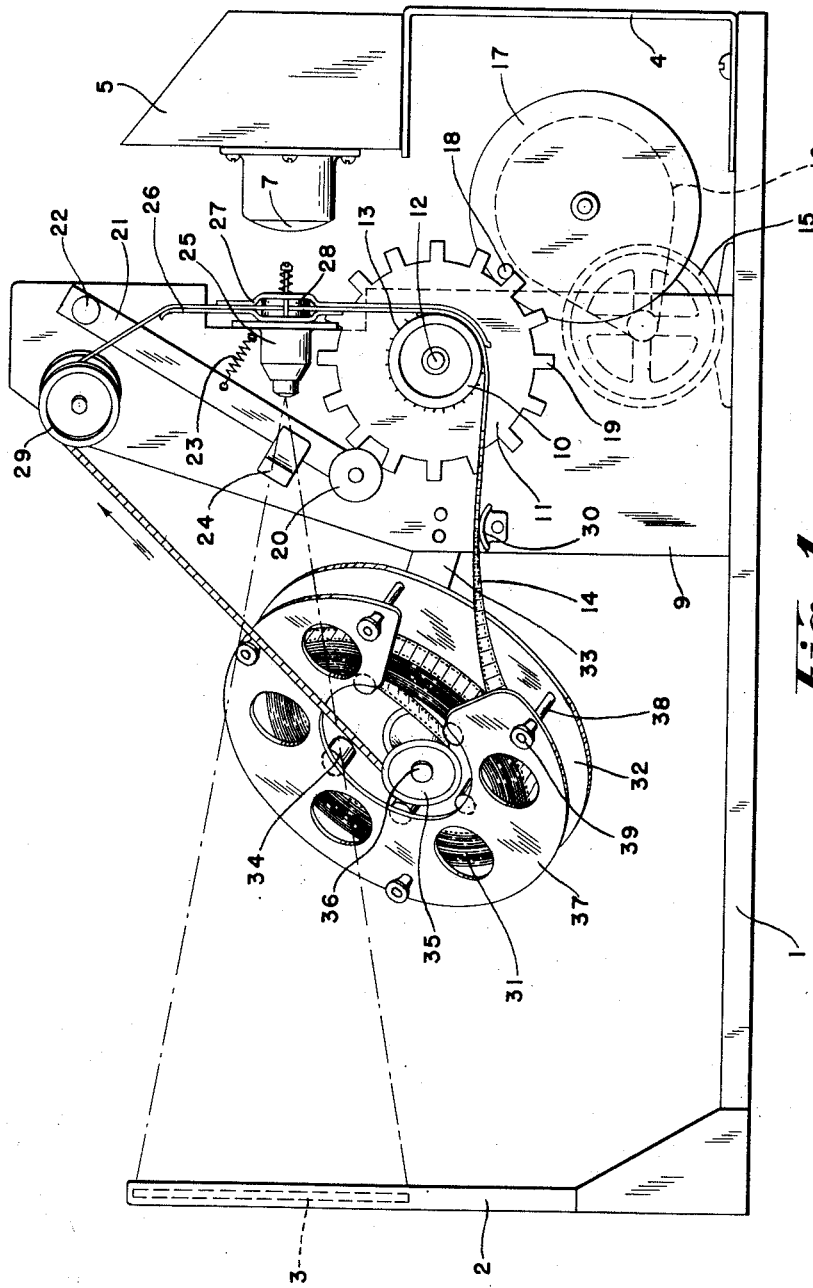
Figure 1 is a side elevational view of an embodiment of my invention.
Figure 2:
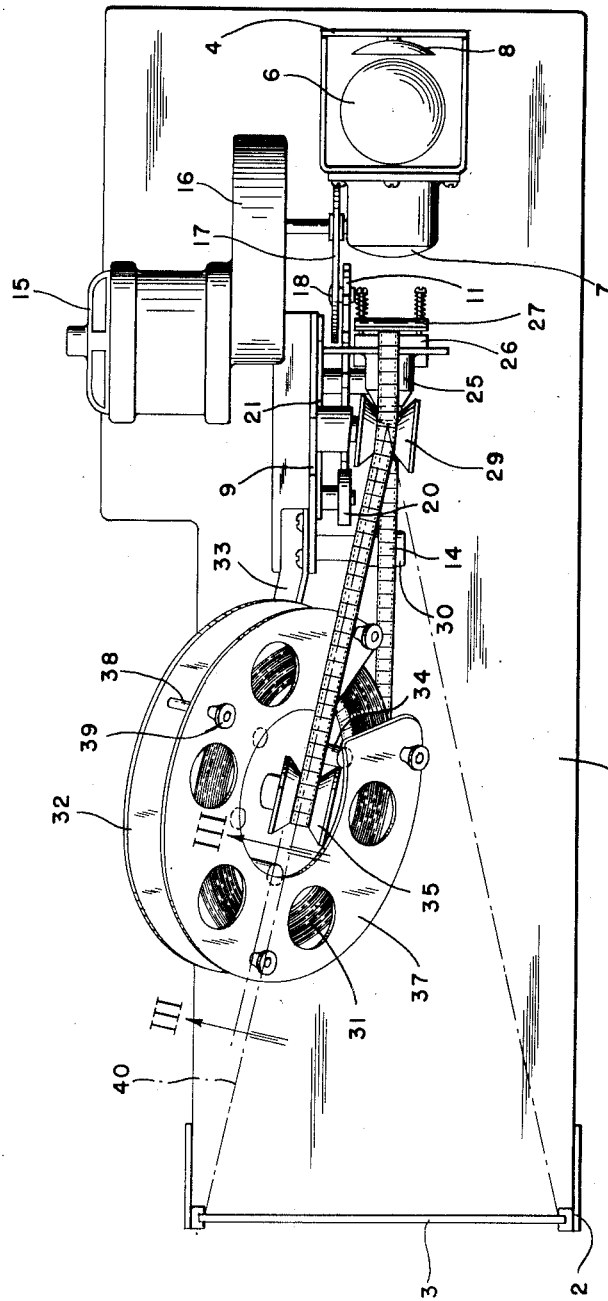
Figure 2 is a plan view thereof.
Figure 3:
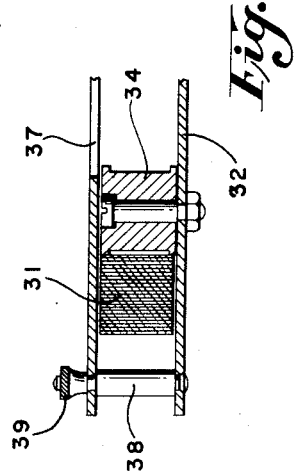
Figure 3 is an enlarged view, in section, of a portion of a film support taken along lines III—III of Figure 2.

With reference to the drawing, and, in particular to Figure 1, I show an embodiment of my invention in the form of a complete apparatus for projecting a continuous length of strip film including means for advancing the film, a support for the film, a drive for the film advancing means, projection optics, a light bulb, and a screen. A frame identified by the reference character 1 supports at one end a bracket 2 which in turn supports a translucent screen 3. At the opposite end of the frame 1 is a bracket 4 adapted to support a housing 5 containing an electric light bulb 6 having its filament in alignment with an optical lens 7. A reflector 8 completes the light source directed toward the film.

Interposed between the light source and the screen and mounted on the frame 1 is a vertical plate 9 adapted to support the principal components of the projection apparatus. A drive wheel 10 and an indexing wheel 11 are joined together for rotation about a shaft 12 supported by a plate 9. The drive wheel 10 includes a plurality of prongs 13 for engagement with conventional perforations bordering each side of a strip of standard film 14. For the purpose of imparting increments of rotary motion to the drive wheel 10, an electric motor 15 is provided which, through a reduction unit 16, rotates a disc 17. A pin 18 projecting from the disk 17 engages projections 19 extending from the indexing wheel 11, and peripherially advances the drive wheel 10 a predetermined distance.

In order to lock the drive wheel so as to position the film in the proper frame location, a pressure wheel 20 engages with a notch formed by two adjacent projections 19 or the wheel 11 and holds the indexing wheel in a fixed position until it is again moved by pin 18. The pressure wheel 20 is supported by an arm 21 pivoted to the plate 9 at 22. A spring 23 maintains the pressure wheel 20 normally in engagement with the indexing wheel 11, and a clip 24 acts as a guide for the arm 21.

In alignment with the light source is an optical mount 25 supported by the plate 9. The strip film 14 passes between the optical mount 25 and the light source. A film guide member 26 is secured to the optical mount 25, and a spring tensioned member 27 produces a light pressure against the film 14 which is interposed between the two members 25 and 27. The members 25 and 27 also support heat absorbing glass plates 28, and it is between these plates that the film 14 passes when in alignment with the optical mount 25.

At the upper end of the plate 9 is a guide roller 29 for positioning the film 14. As the film 14 leaves the drive wheel 10 it passes over a guide member 30 for positioning the film for the wind-up operation.

The film 14, after it leaves the projection apparatus, forms an endless roll 31 resting partly upon a disc 32 supported by a bracket 33 attached to the plate 9. A plurality of rollers 34 supported by the disc 32 provide a support against which the inner face of the roll of film 31 engages. Also supported by the disc 32 is a guide roller 35. This roller 35 is rotatably mounted on a shaft 36 attached to the disc 32 near the central portion of the disc. A cover disc 37 is fastened to the disc 32 in spaced relationship, the space being maintained by spacer rods 38. A thumb-nut 39 functions as means for securing the cover 37 with the disc 32.

One of the essential requirements of the disc 32 is that it be positioned between the optical mount and the screen. It is also essential that the disc 32 and associated cover 37 be positioned out of the range of the path of light between the projecting lens and the screen. It is desirable to maintain the disc 32 as close to the same plane as possible as the drive wheel 10 as determined by the path of the film in projecting position. The position, therefore, of the disc 32 is such that its face is substantially parallel to the outer angle of the projecting ray 40 of the light path between the projecting lens and the screen.

In the operation of the apparatus, the cover 37 is removed and the roll of film 31 is positioned so that the core diameter of the roll engages lightly with the support rollers 34. The endless strip of film 14, as it leaves the center of the roll 31, passes around the guide roll 35 and around the roller 29 and in alignment with the optical mount 25. From here, the film engages the drive wheel 10 and contacts the guide member 30 after which the film is fed back to the outer periphery of the roll of film 31. The film is, therefore, endless, and a substantial quantity of the film up to two or three hundred feet may be effectively processed in this manner. The intermittent jerking of the film as it moves from one frame to another, and a pause of a few seconds before each subsequent movement of a frame allows for an adjustment of the convolutions in the film roll 31 so that the film may be drawn continuously from its inner periphery and fed back to its outer periphery while maintaining substantially the same inner and outer diameter of the film roll throughout its continuous operation.

As thus shown and described, it is believed apparent that I have provided a novel arrangement whereby a film projecting apparatus can operate continuously and efficiently with a substantially large quantity of film joined together to form an endless strip. While I have shown a preferred embodiments of my invention, it is to be understood that it is susceptible of those modifications which appear obviously within the scope of the invention and as appearing in the scope of the appended claims.

Having thus described my invention, what I claim and desire to protect by Letters Patent is:

1. A projection apparatus comprising in combination, a frame, a lens assembly, spaced supports for guiding a length of film across the path of the lens, a light source positioned in alinement with the lens assembly, a screen positioned in alinement at the opposite end of the lens assembly, a supply reel interposed between the projection lens and said screen and having its face substantially parallel to a line forming the border of a beam of light extending from the projection lens to said screen, a disc forming the base of the supply reel, said supply reel being non-rotatable, and a plurality of rollers forming the core of the supply reel supported by the disc and adapted to maintain a plurality of convolutions of endless film in position for withdrawal from and feeding back to said reel, and said reel being further positioned that a length of film extending from the outside and lower portion of said reel lies in substantially the same vertical plane as the center of said projected beam.

2. A projection apparatus comprising in combination, a frame, a lens assembly, spaced supports for guiding a length of film across the path of the lens, a light source positioned in alinement with the lens assembly, a screen positioned in alinement at the opposite end of the lens assembly, a supply reel interposed between the projection lens and said screen and having its face substantially parallel to a line forming the border of a beam of light extending from the projection lens to said screen, a disc forming the base of the supply reel, said supply reel being non-rotatable, and a plurality of rollers forming the core of the supply reel supported by the disc and adapted to maintain a plurality of convolutions of endless film in position for withdrawal from and feeding back to said reel, said supply reel having its axis tipped from the horizontal so that the weight of the convolutions of film rest in part upon said rollers and in part upon said disc, and said reel being further positioned that a length of film extending from the outside and lower portion of said reel lies in substantially the same vertical plane as the center of said projected beam.

WILLIAM F. BOHL, Jr.

REFERENCES CITED

The following references are of record in the file of this patent:

UNITED STATES PATENTS

| Number | Name | Date |
|---|---|---|
| 916,788 | Sandell | Mar. 30, 1909 |
| 1,299,792 | Serrurier | Apr. 8, 1919 |
| 1,474,388 | Stegman | Nov. 20, 1923 |
| 1,677,237 | Jenner | July 17, 1928 |
| 1,816,899 | Godel | Aug. 4, 1931 |
| 2,256,337 | Boor et al. | Sept. 16, 1941 |
| 2,332,717 | Hayer | Oct. 26, 1943 |
| 2,341,313 | Chidister | Feb. 8, 1944 |

FOREIGN PATENTS

| Number | Country | Date |
|---|---|---|
| 23,138 | Australia | Oct. 21, 1929 |